United States Patent [19]

Cross

[11] 4,006,716
[45] Feb. 8, 1977

[54] MINIATURE ANIMAL-WATERING VALVE
[75] Inventor: David L. Cross, Napa, Calif.
[73] Assignee: Atco Manufacturing Co., Inc., Napa, Calif.
[22] Filed: Dec. 1, 1975
[21] Appl. No.: 636,700
[52] U.S. Cl. .............................................. 119/72.5
[51] Int. Cl.² .......................................... A01K 7/00
[58] Field of Search ............ 119/72.5, 75; 137/541, 137/544; 251/322, 323

[56] References Cited
UNITED STATES PATENTS

| 3,527,193 | 9/1970 | Smith | 119/72.5 |
| 3,734,063 | 5/1973 | Atchley | 119/72.5 |
| 3,800,825 | 4/1974 | Zoll | 119/72.5 X |

Primary Examiner—Hugh R. Chamblee
Attorney, Agent, or Firm—James R. Cypher

[57] ABSTRACT

A miniature valve for very small animals such as tiny weanling mice consisting briefly of a housing having an interior passage. A lever arm extends through the passage and slightly beyond the end of the housing so that the animal can move the lever by biting it with its teeth or deflecting it with its tongue. Deflection of the valve arm causes a valve head member to pivot and partially lift off a valve seat. The valve seat is of resilient material and formed at an angle to the underside of the valve head so that a "line-point" type contact is made between the valve head member and the valve seat. A biasing member, such as a spring, returns the lever arm to a centered position when the animal lets go of the lever thereby automatically preventing further water flow.

3 Claims, 13 Drawing Figures

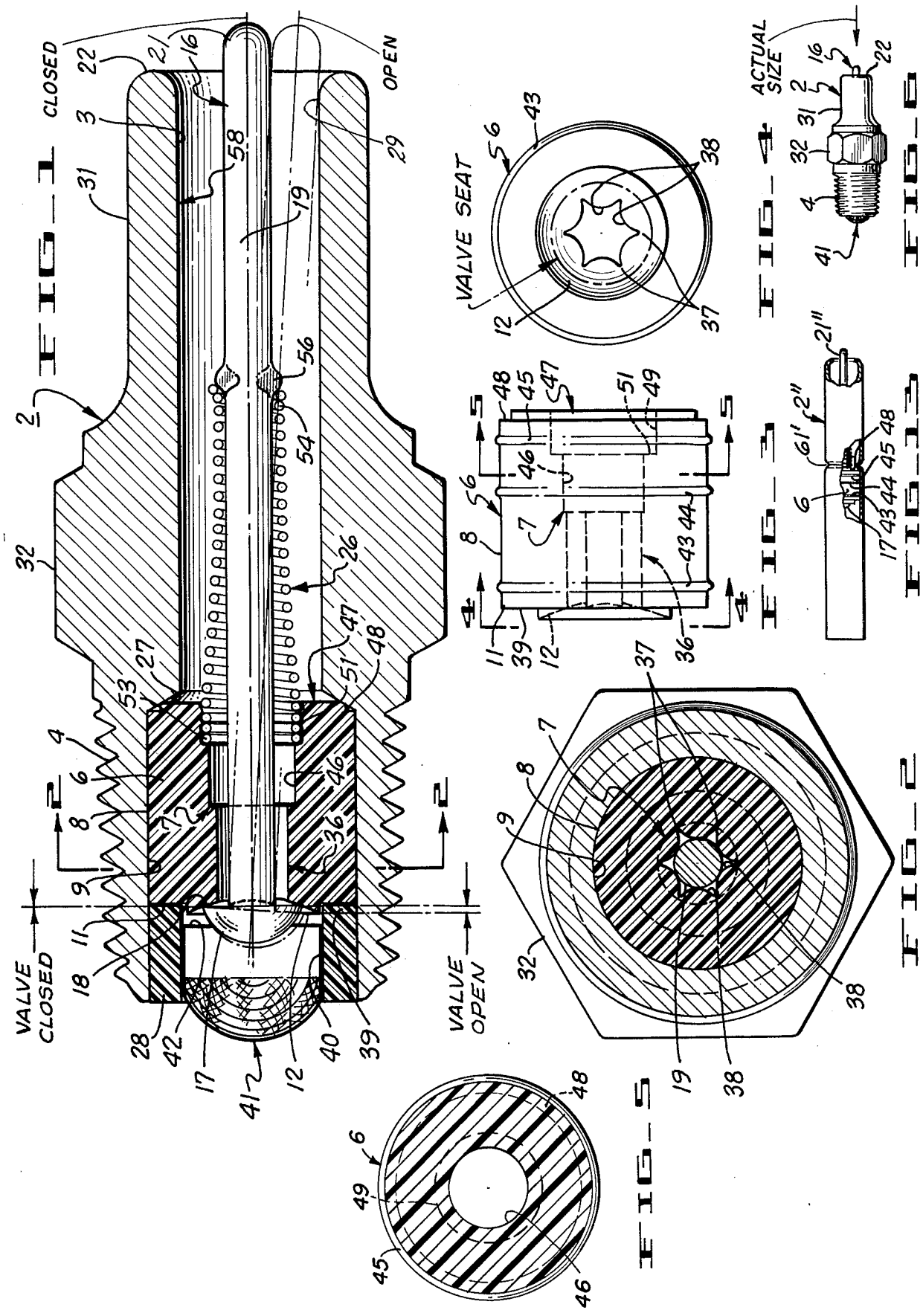

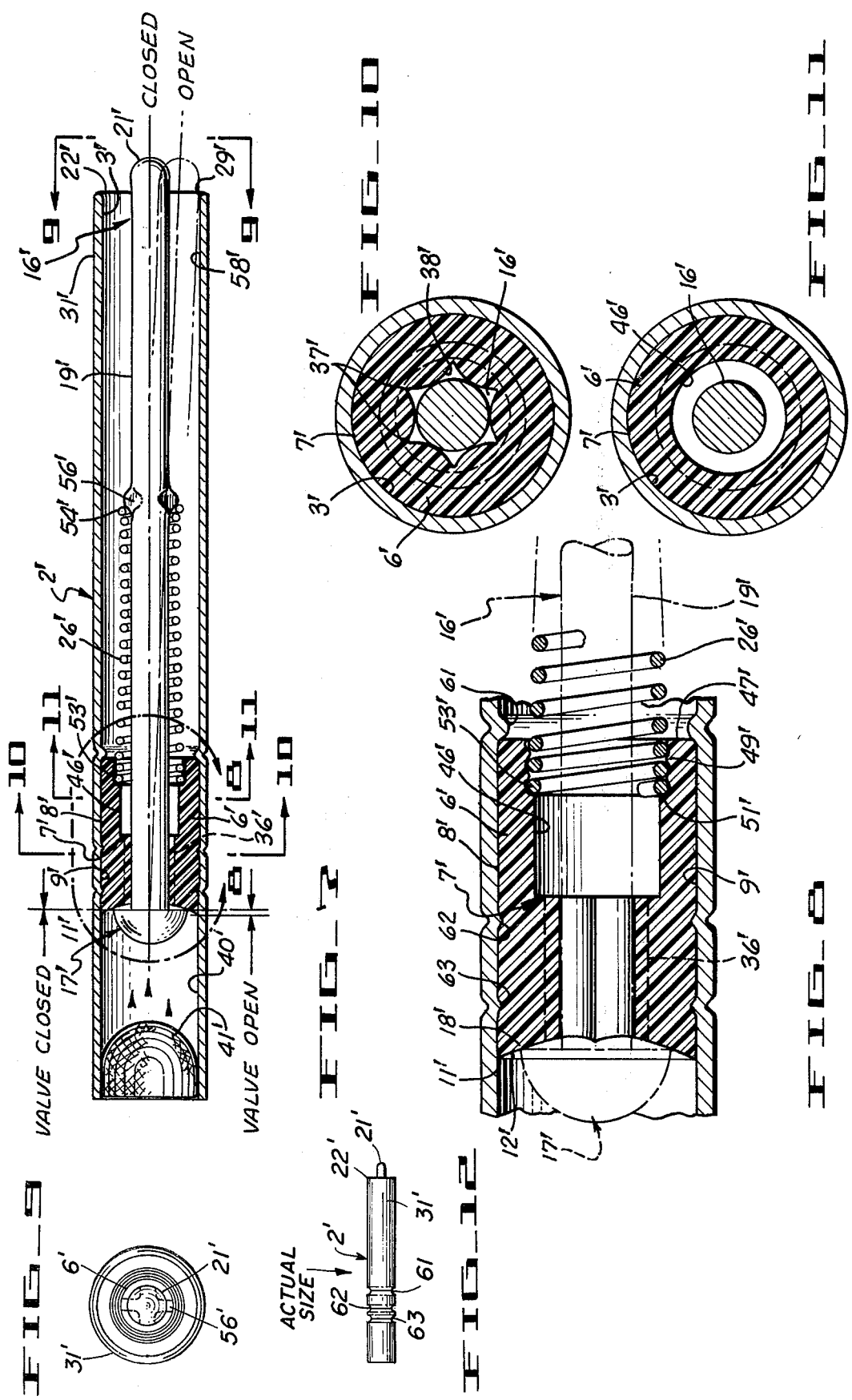

MINIATURE ANIMAL-WATERING VALVE

BACKGROUND OF THE INVENTION

Watering valves for animals such as hamsters, guinea pigs, chinchillas, rabbits, dogs, monkeys, and pigs have been in use for several years. A need for automatic watering valves for very small animals such as tiny weanling mice has developed due to the increased use of small animals in laboratories to test various foods and chemical substances. Attempts to merely scale down existing valves has resulted in failure. Scaled-down valves became clogged with mineral deposits or will not automatically shut off at lower operating pressures. Increasing the pressures solved the shut off problem but the weanling mice could not shut off the valve, however low water pressures result in complete flow stoppage when air became entrapped in the valve housing or supply lines. Unless the valves are automatically shut by a spring loaded device, bacteria can migrate back through one valve to the entire system.

SUMMARY OF THE INVENTION

The gist of the present invention is the use of a unique valve seat construction which practically eliminates the problem of mineral deposit build-up and permits operation of the valve over a wide pressure range at relatively high pressures of between 5 psi and 10 psi. Water flow is regulated by the amount of deflection of the lever rather than presenting a mere "on-off" situation. The configuration of the valve and the arrangement of the elements results in a "baffling" of the flow so that high pressure directed streams do not injure or frighten the animal. Further, the valve is designed so that consumption is essentially 100%. There is little or no wastage to wet the cage and the animal.

The valve is constructed with a long lever arm so that very tiny animals such as weanling mice can actuate the valve, yet the valve is rugged enough so that it can be used to water fullgrown rabbits, and monkeys.

Animal training is virtually eliminated by providing a small amount of water at the end of the valve to attract the animal.

The valve prevents migration of bacteria back into the supply lines when the water is turned off.

BRIEF DESCRIPTION OF THE DRAWINGS

FIG. 1 is an enlarged cross sectional view of the valve of the present invention taken along the longitudinal axis of the valve shown in FIG. 6.

FIG. 2 is a cross-sectional view of the valve taken along line 2—2 of FIG. 1.

FIG. 3 is a side view of the valve seal member which is one of the component parts of the valve shown in FIG. 1.

FIG. 4 is an end view of the valve seal member shown in FIG. 3.

FIG. 5 is a cross-sectional view of the valve seal member taken along line 5—5 of FIG. 3.

FIG. 6 is a side view of the valve of the present invention. The drawing of the valve as presented to the Patent Office on the Bristol Boards is actual size.

FIG. 7 is a cross sectional view of an alternate form of the invention. The view is taken along a longitudinal axis of the valve shown in FIG. 12.

FIG. 8 is an enlarged view of a portion of the valve in cross section showing the valve seal member, a portion of the valve lever member and a portion of the spring.

FIG. 9 is an end view of the valve shown in FIG. 7 taken along line 9—9.

FIG. 10 is a cross-sectional view of the valve member shown in FIG. 7 and taken along line 10—10.

FIG. 11 is an enlarged cross-sectional view of the valve shown in FIG. 7 taken along line 11—11.

FIG. 12 is a side view of a modified form of the valve. The drawing of the view as furnished to the Patent Office on Bristol Board is actual size.

FIG. 13 is a side view, shown in full scale in the Bristol Board drawing of an alternate form of the invention shown in FIG. 1.

BRIEF DESCRIPTION OF THE PREFERRED EMBODIMENTS OF THE INVENTION

The miniature animal-watering valve of the present invention consists briefly of an enlongated housing 2 formed with a cylindrical passage 3 therethrough and is adapted for connection to a water supply such as a manifold pipe as by pipe threads 4; a cylindrical valve seal member 6 having a passage 7 therethrough and the seal member has an outside wall 8 dimensioned to sealably engage the inner wall 9 of the housing passage, and the upstream end 11 of the seal member is formed with an inwardly sloping conical surface 12; a valve lever member 16 having a valve head member 17 formed with an annular small radius outer edge 18 positioned for "line-point" contact with the sloping conical surface of the valve member and the valve lever member also having a lever arm 19 extending from the head axially through the housing passage and spaced form the inside wall and extending to a rounded end 21 slightly beyond the distal end 22 of the housing; biasing means such as a spring 26 mounted in the housing and engaging the lever arm for centering the valve lever member; and means such as shoulder 27 formed in the housing and a retainer sleeve 28 for holding the valve seal member in a fixed position within the housing.

The valve housing is preferably made of stainless steel to provide a hard surface which animals cannot damage with their teeth and which will not rust. The passage 3 is dimensioned so that lever arm 19 can move with a 360° radial movement by pivoting about its head. The inside end surface 29 serves as a stop surface to limit the movement of the lever arm. The broken lines shown in FIG. 1 show the lever arm 19 at the open position and the closed position is shown in solid line.

The housing is formed with a smooth outer wall surface 31 for animals that place their lips around the valve end. The outer housing is also formed with a hexagonally-faced portion 32 so that the valve can be threadably inserted into a pipe header by a wrench.

The valve seal member is made from a durable, autoclavable synthetic nontoxic elastomer such as rubber. The properties of the member such as hardness, virtually no water absorption, flexibility and memory, must be carefully chosen so that the member will form a water seal with the inside wall of the housing yet at the same time, the sloping surface 12 will be sufficiently rigid so that the metal valve head 17 will not completely compress and flatten the curved or sloping surface.

A unique feature of the valve seal member is its use as a biasing means to return the valve lever member to a centered position. A portion 36 of the upstream side of the valve seal passage 7 is formed with a symmetrical spline pattern consisting of alternating elongated grooves 37 and ridges 38. The water flows through the grooves and the ridges are in touching contact with lever arm 19. Deflection of the lever arm to the open position as in FIG. 1 compresses the ridges of the spline. When the animal lets go of the end of the lever arm, the "memory" of the material assists the spring in returning the lever arm to the centered position.

It has been found that the ridges of the valve seal passage should be formed with a smooth radiused or curved shape. Not only do sharp edges wear away, but it has been found that sharp edges take a set in a short period of time which destroys the biasing function of the valve seal member.

As shown in FIGS. 1 and 3, the valve seal member is formed with an annular land 39 adjacent its outer circumference for receiving the spacer sleeve 28. A debris screen 41 should also be used and the screen rim 42 may also rest on the land 39. Separation of the valve seal land from the valve seat 12 minimizes the distortion effect of the spacer 28 on the valve seat surface. As shown in FIG. 1, the debris screen is spaced from the head of the valve lever member forming a chamber 40. The screen prevents the intrusion of debris into the chamber which could become lodged between the head of the valve lever member and the valve seat.

Referring to FIG. 3, the valve seat member is formed with a plurality of axially spaced annular curved protrusions 43, 44, and 45 for sealably engaging the inner wall of the housing. The purpose of placing the rounded protrusions or beads on the outside of the main body of the valve seal member is to seal and prevent distortion of the passage 7. Distortion in the spline area would cause mis-centering of the valve member, or pinching of the valve lever arm so that it would be difficult for the animal to move the lever. The beads should be round and not angular such as a V-shape to prevent compression-set of the rubber. The beads enable a 0.004 inch tolerance to be maintained in passage 7.

As shown in FIGS. 1 and 3, the spline pattern does not continue the entire length of the valve seal member. The splines have a length approximately ½ to the seal member length leaving a smooth wall portion 46 having a diameter slightly larger than the diameter of the bottom portions of the grooves 37.

As a further important detail, it should be noted that the shoulder 27 of the housing slants inwardly. The downstream end 47 is generally flat with a stepped outer land 48. This gives less distortion to the seal and improves the seal between the resilient member and the metal housing. The land also locates the seal member in relation to the housing.

The downstream end of the valve member seal is formed with an enlarged opening 49 which is greater than opening 46 so as to form a land 51 for the centering spring 26.

The diameter of chamber 49 of the valve seal member is carefully dimensioned so that when the valve seal member is in a relaxed state, it is just slightly larger than the diameter of the end 53 of spring 26. When the valve seal member is forced into the housing, the inner wall of the housing compresses protrusion 45 thereby deforming the synthetic rubber so that the walls of chamber 49 flow around the spring coils and grip it tightly in a frictional and mechanical grip.

Note that the spring 26 has a conical shape so that the diameter of the spring at end 53 which rests on land 51 is greater in diameter than the downstream end 54 which is retained on protrusion shoulders 56 formed on valve arm 19. The spring is preferably stainless steel to prevent rusting. The spring is designed so that when it is compressed, as by pushing axially on the lever, the coils stack without interlocking. Such a spring design prevents "off-centering" thereby preventing leakage.

The valve lever member is preferably made from stainless steel to prevent rust and to permit easy sterilization of the entire valve. The lever arm is long in proportion to the distance from the center of the lever to the edge 18 of the valve head. The length is between 20 and 25 times the distance between the center and the outer edge, thereby providing about a 20 to 25 to 1 mechanical advantage. Thus even very small or very weak animals can open the valve.

Referring to FIG. 1, it should be noted that there is a chamber between the lever arm 19 and the cylindrical passage 3. This chamber, as indicated by the number 58, provides a "reservoir" of entrapped water to attract the animal. This reservoir of water which extends nearly to the valve tip effectively eliminates the animal training problem. This fact is of crucial importance to satisfactory performance of automatic watering.

Referring to FIG. 13, a different version of the valve shown in FIG. 1 is shown. The synthetic rubber seal member 6, the spring 26 and the valve lever member 19 are identical to those corresponding parts shown in FIG. 1. As shown, however, the housing 2" is a piece of tubing of constant diameter with an indent 61' formed in the wall. Shoulder 48 of the seal member 6 rides against the inner protrusion 61' to prevent the seal from being forced through the housing by water pressure. The valve operates in the identical manner as the valve in FIG. 1. It may be pointed out that when the valve seal member is forced into the housing passage, the inner wall of the housing presses against outer protrusion 45. The valve seal member is deformed at its end so that the walls of the enlarged opening 49 flow around the coils of the end 53 of the spring 26 thereby gripping the spring to prevent it from becoming unseated. Thus if an animal or person should pull on valve arm 19, the end 53 of spring 26 will not become unseated from chamber 49.

An even smaller version of a modified form of the valve previously described is shown in FIGS. 7 — 12. This threadless tube valve is mainly for installation with flexible hoses or rubber grommets. Similar parts are numbered with the same numbers and differentiated only by a (') prime mark.

As shown in FIGS. 12 and 7, the housing 2' is much thinner and lacks the threaded portion and the hexagonal "nut" portion for attachment by a wrench. A cylindrical passage 3' is formed through the housing. A cylindrical valve seal member 6' having a passage 7' and an outside wall 8' is dimensioned to sealably engage the inner wall 9' of the housing passage. The upstream end 11' of the seal member is formed with an inwardly sloping conical surface 12'. This surface may be a straight line in cross section or a curved line. A valve lever member 16' having a valve head member 17' formed with an annular small radius outer edge 18' is positioned for "line-point" contact with the sloping conical or curved surface of the valve member. The valve lever member also has a lever arm 19' which extends from the head, axially through the housing passage to a rounded end 21' slightly beyond the distal end 22' of the housing. The lever arm is normally centered in the housing passage as shown in solid line in FIG. 7 when the valve is closed. Biasing means such as a spring 26' is mounted in the housing and engages the lever arm for centering the valve lever member.

The means for holding the valve seal within the housing consists of a plurality of annular indents formed in the housing which protrude into the cylindrical passage. Annular indent 61 is formed immediately downstream of the lower edge of the valve seal member and is in contact with the downstream end 47' of the valve seal member to locate the valve seal member relative to the housing. To increase the ability of the valve seal member to stay within the boundary of indent 61, the valve seal member is formed so that its downstream end portion flares slightly outwardly. In other words, the diameter of the valve seal member increases slightly and gradually at its downstream end. When the valve seal member is placed within the housing passage, the valve seal member is compressed slightly more at its downstream end.

Compression of the flared end of the valve seal member causes the chamber 53' to deform so as to flow around the end coils of spring 26' as shown in FIG. 8. Thus, the rubber grips the end of the spring so that it cannot be easily unseated if an animal or person should pull axially on the lever arm 19'. This prevents the spring from slipping into chamber 46' thereby preventing the spring from going off center which condition might hold the valve in the "on" position.

The valve housing is preferably made of stainless steel to provide a hard surface which animals cannot easily damage with their teeth and which will not rust. The passage 3' is dimensioned so that lever arm 19' can move with a 360° radial movement by pivoting about its head. The inside end surface 29' serves as a stop surface to limit the movement of the lever arm. The broken lines shown in FIG. 7 indicate the lever arm 19' at the open position.

The housing is formed with a smooth outer wall surface 31' for animals that place their lips around the valve end.

The valve seal member is made from a durable, autoclavable nontoxic elastomer such as synthetic rubber. The properties of the member, such as hardness, memory and flexibility must be carefully chosen so that the member will form a water seal with the inside wall of the housing, yet at the same time, the sloping surface 12' will be sufficiently rigid so that the metal valve head 17' will not completely compress and flaten the curved or sloping surface.

A unique feature of the valve seal member is its use as a biasing means to return the valve lever member to a centered position. A portion 36' of the upstream side of the valve seal passage 7' is formed with a symmetrical spline pattern consisting of alternating elongated grooves 37' and ridges 38'.

The water flows through the grooves and the ridges are in touching contact with lever arm 19'. Deflection of the lever arm to the open position as shown in FIG. 7 compresses the ridges of the spline. When the animal lets go of the end of the lever arm, the "memory" of the material assists the spring in returning the lever arm to the centered position.

As set forth above, the ridges of the valve seal passage should be formed with a smooth radiused or curved shape to reduce wear and prevent the ridges from taking a set in a short period of time.

As shown in FIG. 7, a debris screen 41' is placed within the valve housing. The screen is spaced from the head of the valve lever forming a chamber 40'. The screen prevents the intrusion of debris into the chamber which could become lodged between the head of the valve lever member and the valve seat.

As shown in FIGS. 7 and 8, the spline pattern does not continue the entire length of the valve seal member. The splines have a length approximately one-half to two-thirds of the length of the valve seal member leaving a smooth wall portion 46' having a diamter slightly larger than the diamter of the bottom portions of the grooves 37'.

The downstream end of the valve member seal is formed with an enlarged opening 49' which is greater than opening 46' so as to form a land 51' for the centering spring 26'. Note also that the spring 26' has a conical shape so that the diameter of the spring at end 53' which rests on land 51' is greater in diameter than the downstream end 54' which is retained on protrusion shoulders 56' formed on valve arm 19'. The spring is preferably stainless steel to prevent rusting.

The lever arm is also made of stainless steel to prevent rust and to permit easy sterilization of the entire valve. The lever arm is long in proportion to the distance from the center of the lever to the edge 18' of the valve head. The length is between 20 and 25 times the distance between the center and the outer edge, thereby providing about a 20 to 25 to 1 mechanical advantage. Thus even very small or very weak animals can open the valve.

Referring to FIG. 7, it should be noted that there is a chamber between the lever arm 19' and the cylindrical passage 3'. This chamber, as indicated by the number 58' provides a "reservoir" of water which extends nearly to the valve tip to attract the animal. This exposed reservoir of water at the valve tip effectively eliminates the animal training problem. As stated above in reference to the valve shown in FIGS. 1 – 6, this fact is of crucial importance to satisfactory performance of automatic watering.

Both valves function satisfactorily on non-critical water pressure anywhere from 0 – 20 psi. The recommended operating pressure is 5–10 psi. This safe, non-critical water pressure effectively precludes any problem of water flow stoppage from entrapped air in the supply lines. The advantage of a broad performance pressure range is uniform service to animals on the bottom shelves of a rack as well as the top shelf. Room distribution of the cages can be installed on walls or ceilings without regard to hydrostatic pressure effects. This is important since 2.2 feet elevation equals 1 psi and if the pressure control gauge is 84 inches (2.1 meters) from the floor and reads 4 psi, the animals in cages one foot (0.30 meters) from the floor are drinking from the valves at 6.5 psig.

The fact that both valves are spring-loaded means that the valves are sealed from the supply line when the valves are in the off position. Further, the springs turn the valves off whether there is pressure in the supply line or not. Thus the valves of the present invention, as distinguished from low pressure plunger valves which require pressure to remain closed, remain sealed off from the distribution system when system pressure is turned off. Thus migration of bacteria back into the supply lines when the system water pressure is turned off is prevented. This design feature is of inestimable value in avoiding cross-contamination of the animals.

The biggest problem encountered in watering valves, especially miniature valves as set forth in this application, is the inability to provide a design which weanling mice can operate and yet permit the lever arm to center itself automatically and thereby securely close the valve. The unique sloping valve seat surfaces 12 and 12' of these valves serves to help center the head members 17 and 17'. In all other valves where the valve seat is flat and the underside surface of the valve heads are flat, the valve seat surface does not provide any forces tending to center the valve lever member. In the present case, however, the sides of the valve seat slope so that the valve heads tend to slide to the center along their outer edges 18 and 18'.

The sloping valve seat also tends to be self cleaning. Since the valve head is free to rotate and the head contacts the valve seat along a line instead of a flat surface, the movement of the valve and the re-seating in a slightly different position each time, tends to cause a slight scraping of the curved valve seat surface, resulting in a cleaning of the valve seat. Thus it is almost impossible for mineral deposits to build up and prevent good seating and closing of the valve.

Referring to FIG. 8, the tube wall is formed with annular indents 62 and 63. These indents help to hold the valve seal member in the tube but primarily they prevent leakage between the seal and the inside wall of the housing. The amount of identation must be controlled so that a 0.002' tolerance is maintained in passage 7'.

I claim:

1. A miniature animal-watering valve comprising:
  a. an elongated housing formed with a cylindrical passage therethrough; and adapted for connection to a water supply;
  b. a cylindrical valve seal member having a passage therethrough and an outside wall dimensioned to sealably engage the inner wall of said housing passage, and the upstream end of said seal member is formed with an inwardly sloping conical surface;
  c. a valve lever member having a valve head member formed with an annular small radius outer edge positioned for "line-point" contact with said sloping conical surface of said valve seal member and said valve lever member also having a lever arm extending from said head axially through said housing passage and spaced from said inside wall and extending slightly beyond the distal end of said housing;
  d. biasing means mounted in said housing and engaging said lever arm for centering said valve lever member;
  e. means holding said valve seal member in a fixed position within said housing;
  f. said means holding said valve seal member consists of a plurality of annular indents formed in said housing protruding into said cylindrical passage;
  g. one of said annular indents is formed immediately downstream of the lower edge of said valve seal member and is in contact with said member; and
  h. said valve seal member is formed with a downstream portion having a gradually increasing outside diameter for positively engaging said downstream indent.

2. A miniature animal-watering valve comprising:
  a. an elongated housing formed with a cylindrical passage therethrough, and adapted for connection to a water supply;
  b. a cylindrical valve seal member formed with valve seat surface at its upstream end and having a passage therethrough and an outside wall dimensioned to sealably engage the inner wall of said housing passage, and said valve seal member is formed with at least one annular curved protrusion on its outside surface adjacent its downstream end having an outer dimension greater than the inside dimension of said cylindrical passage;
  c. a valve lever member having a valve head member formed with a surface positioned for contact with said valve seat of said valve seal member, and said valve lever member also having a lever arm extending from said head axially through said housing passage and spaced from said inside wall and extending slightly beyond the distal end of said housing;
  d. said valve seal member is formed with a spring retainer cylindrical cavity, opening to the downstream end;
  e. a spring mounted in said housing on said lever arm;
  f. means mounted on said lever arm retaining the downstream end of said spring; and
  g. the upstream end of said spring is dimensioned to closely fill said cylindrical cavity in said valve seal member so that upon assembly of said valve seal member and said spring within said elongated housing, said inside wall of said cylindrical passage compresses said annular curved protrusion which in turn deforms said end of said valve seal member, which in turn compresses the walls of said cylindrical cavity against the upstream end of said spring.

3. A miniature animal-watering valve comprising:
  a. an elongated housing formed with a cylindrical passage therethrough and having an upstream end adapted for connection to a water supply and inwardly protruding means on the inside wall;
  b. a cylindrical valve seal member having a passage therethrough and an outside wall dimensioned to sealably engage the inner wall of said housing passage, the upstream end of said seal member is formed with a valve seat, the downstream end is formed with a spring retainer cylindrical cavity which opens to the downstream end, and said seal member is formed with a downstream portion having a gradually increasing flared outside diameter;
  c. a valve lever member having a valve head formed with a surface positioned for contact with said valve seat of said valve seal member, and said valve lever member also having a lever arm extending from said head axially through said housing passage and spaced from said inside wall and extends slightly beyond the distal end of said housing;
  d. a spring mounted in said housing on said lever arm;
  e. means mounted on said lever arm retaining the downstream end of said spring; and
  f. the upstream end of said spring is dimensioned to closely fill said cylindrical cavity in said valve seal member so that upon assembly of said valve seal member and said spring within said elongated housing, said inside wall of said cylindrical passage compresses said flared portion of said valve seal member thereby deforming the walls of said cylindrical cavity against the upstream end of said spring.

* * * * *

UNITED STATES PATENT AND TRADEMARK OFFICE
CERTIFICATE OF CORRECTION

PATENT NO. : 4,006,716
DATED : February 8, 1977
INVENTOR(S) : David L. Cross

It is certified that error appears in the above-identified patent and that said Letters Patent are hereby corrected as shown below:

Column 3, line 40, after 1/2 to add --- 2/3'ds ---

Column 7, line 26, change "0.002'" to --- .002" ---

Signed and Sealed this

Nineteenth Day of April 1977

[SEAL]

Attest:

RUTH C. MASON
*Attesting Officer*

C. MARSHALL DANN
*Commissioner of Patents and Trademarks*